United States Patent [19]

Sasaki et al.

[11] Patent Number: 5,278,717

[45] Date of Patent: * Jan. 11, 1994

[54] DISK CARTRIDGE

[75] Inventors: Morimasa Sasaki, Saku; Haruo Shiba, Komoro; Masaru Ikebe, Saku; Kenji Hashizume, Miyota, all of Japan

[73] Assignee: TDK Corporation, Japan

[*] Notice: The portion of the term of this patent subsequent to Oct. 6, 2009 has been disclaimed.

[21] Appl. No.: 771,409

[22] Filed: Oct. 1, 1991

[30] Foreign Application Priority Data

Oct. 2, 1990 [JP] Japan .............................. 2-103345[U]
Dec. 21, 1990 [JP] Japan .................................. 2-404060
Mar. 7, 1991 [JP] Japan .................................... 3-19629

[51] Int. Cl.⁵ .......................................... G11B 23/03
[52] U.S. Cl. ................................. 360/133; 369/291
[58] Field of Search ......................... 360/133; 369/291

[56] References Cited

U.S. PATENT DOCUMENTS

| | | | |
|---|---|---|---|
| 4,630,728 | 12/1986 | Matsumoto et al. | 360/133 |
| 4,644,434 | 2/1987 | Oishi et al. | 360/133 |
| 4,695,911 | 9/1987 | Loosen | 360/133 |
| 5,119,256 | 6/1992 | NakaMats | 360/133 |
| 5,153,801 | 10/1992 | Ikebe et al. | 360/133 |

Primary Examiner—Edward P. Westin
Assistant Examiner—Jon Santamauro
Attorney, Agent, or Firm—Price, Gess & Ubell

[57] ABSTRACT

A disk cartridge has a case rotatably containing a disk therein and is formed with a driving shaft insertion hole and a plurality of pickup insertion holes. A rotary shutter is provided and rotatably supported by a disk holder disposed around the driving shaft insertion hole to open and close the pickup insertion holes. A turning shutter is provided rotatably about a center separate from a center of the rotary shutter to open and close the driving shaft insertion hole. The disk holder is provided with surfaces for positioning the rotary shutter and the turning shutter. Both of the shutters are held and guided by the disk holder to open and close the driving shaft insertion hole and the pickup insertion holes during charging or removing the disk cartridge into or from a disk player.

16 Claims, 7 Drawing Sheets

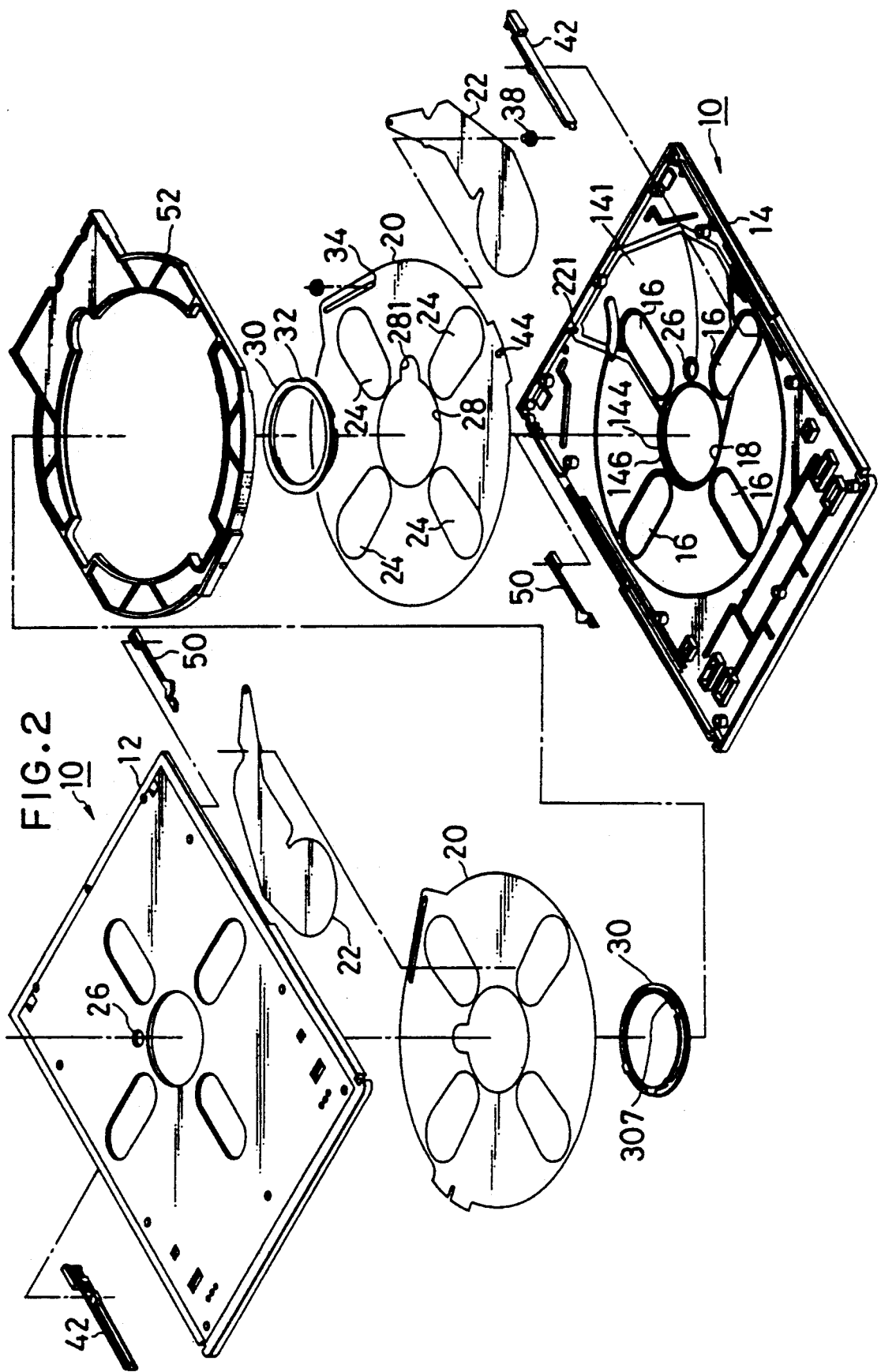

DISK CARTRIDGE

BACKGROUND OF THE INVENTION

1. Field of the Invention

This invention relates to a disk cartridge which rotatably contains a flexible disk or a hard disk, or particularly an optical disk in a case.

2. Description of the Related Art

A flexible disk, an optical disk or an optomagnetic disk as an information recording carrier is generally used by setting it in a recorder/reproducer such as a disk player or the like in the form of a disk cartridge contained in a case.

A conventional disk of this type is known which is contained in a case with a slide shutter for opening a pickup insertion hole and a driving shaft insertion hole formed in the case when the disk is being used and closing them when the disk is not being used. The slide shutter is provided to prevent dust from adhering to the disk, damage to the disk, and any large change in temperature affecting the disk.

However, when a large quantity of data is momentarily recorded or reproduced in an optical disk or the like, a plurality of pickup insertion holes are required. If the plurality of pickup insertion holes are formed in the disk's cartridge, shutters are needed for simultaneously opening all the pickup insertion holes and the driving shaft insertion hole when the disk is being used, or closing the same when the disk is not being used, so as to protect the disk against dust and the like, but a problem may arise in that, if a unidirectional slide shutter is employed to open and close these holes, the entire disk cartridge must be increased in size.

Use of a rotary shutter has been considered, but if the rotary shutter is opened and closed by a slider, coupling a section of the shutter it to the slider must be disposed outside a disk rotating region. The distance the slider has to slide is increased, and there are further problems in that a shutter opening and closing mechanism increases in size, the distance a spring has to travel to close the shutter is increased, and the difference between the shutter operating force when the shutter is opened and when it is closed becomes large. If a slider having a linear motion is engaged with a rotary shutter having a rotating motion, there is a position where the shutter opening and closing forces become very strong. Thus, in some cases, the shutter is not opened or closed, and the shutter is deformed by this very strong force. Further, there are methods of reducing the sliding distance of the slider so that a reduction gear is employed or disposing the position of interlocking the slider to the shutter at the end of a sliding range of the slider with respect to the slider sliding direction. However, in the former method, a space in which the shutter opening and closing mechanism is placed is increased or a larger shutter opening or closing force is required. In the latter method, the direction in which the slider force acts is different from the shutter force operating direction so that the slider and the shutter are hardly operated or the shutter is deformed by forcibly operating. Thus, the construction of this mechanism is complicated.

The inventors have proposed a disk cartridge provided with a rotary shutter in combination with a turning shutter. In such a disk cartridge, the outer diameter of the rotary shutter and the arm length of the turning shutter are so large that some problems arise so that deflection of the shutters occurs in a portion thereof near the driving shaft insertion hole and a gap between the shutters and the case is liable to permit dust to enter into the disk cartridge. It is also harder to rotate the rotary shutter in case of supporting it at the outer periphery thereof than in the case of supporting it at the inner periphery thereof. Therefore, it is preferable to support the rotary shutter at the inner periphery thereof. However, it is necessary to consider that the inner periphery of the rotary shutter overlaps the moving area of the turning shutter. Unless the shutters are supported sufficiently, the rotary shutter will skew with respect to its axis of rotation, or the outer periphery of the rotary shutter will rub against the case to cause a braking action thereto, so that there will be problems in that the operating force of the rotary shutter or the shutters will not be able to open and close smoothly.

In case supporting portions which movably support the rotary shutter and the turning shutter or position these shutters are made of synthetic resin, such portions are cut easily by the shutters. The worn powder from these portions adheres to the disk surface so that an error in reading occurs or the damage to the disk surface is done. In case a surface supporting the disk is made of synthetic resin, dust easily adheres to the disk surface due to static electricity and an error in reading occurs.

SUMMARY OF THE INVENTION

The present invention has been made in view of the foregoing disadvantages in such arrangements above-mentioned. Accordingly, an object of this invention is to provide a disk cartridge which can eliminate the above-described drawbacks of the conventional disk cartridge and which can safely and very easily contain a disk, even when the case for containing a disk has a plurality of pickup insertion holes.

Another object of this invention is to provide a disk cartridge which can positively open and close insertion holes and can prevent dust from entering therein.

Still another object of this invention is to provide a disk cartridge which can smoothly and safely operate shutters for opening and closing insertion holes while preventing the shutters from rubbing against any other members.

According to this invention, a novel disk cartridge is provided. The disk cartridge of this invention comprises a case which can rotatably contain a disk and is formed with a driving shaft insertion hole and a plurality of pickup insertion holes. A plurality of window holes are formed at positions corresponding to the plurality of pickup insertion holes formed in the case, and a rotary shutter is rotatably provided around the driving shaft insertion hole. A turning shutter having a center at a position separate from the center of the rotary shutter for opening and closing the driving shaft insertion hole is formed in the case. A positioning means is provided for supporting the rotary shutter and for positioning the rotary shutter and the turning shutter in a direction of the axis of rotation of the disk.

These and other objects and features of the present invention will become apparent from the following detailed description when read in conjunction with the attached drawings.

BRIEF DESCRIPTION OF THE DRAWINGS

FIG. 2 is a perspective view of a disassembled disk cartridge;

DESCRIPTION OF THE PREFERRED EMBODIMENT

Figure 1A:
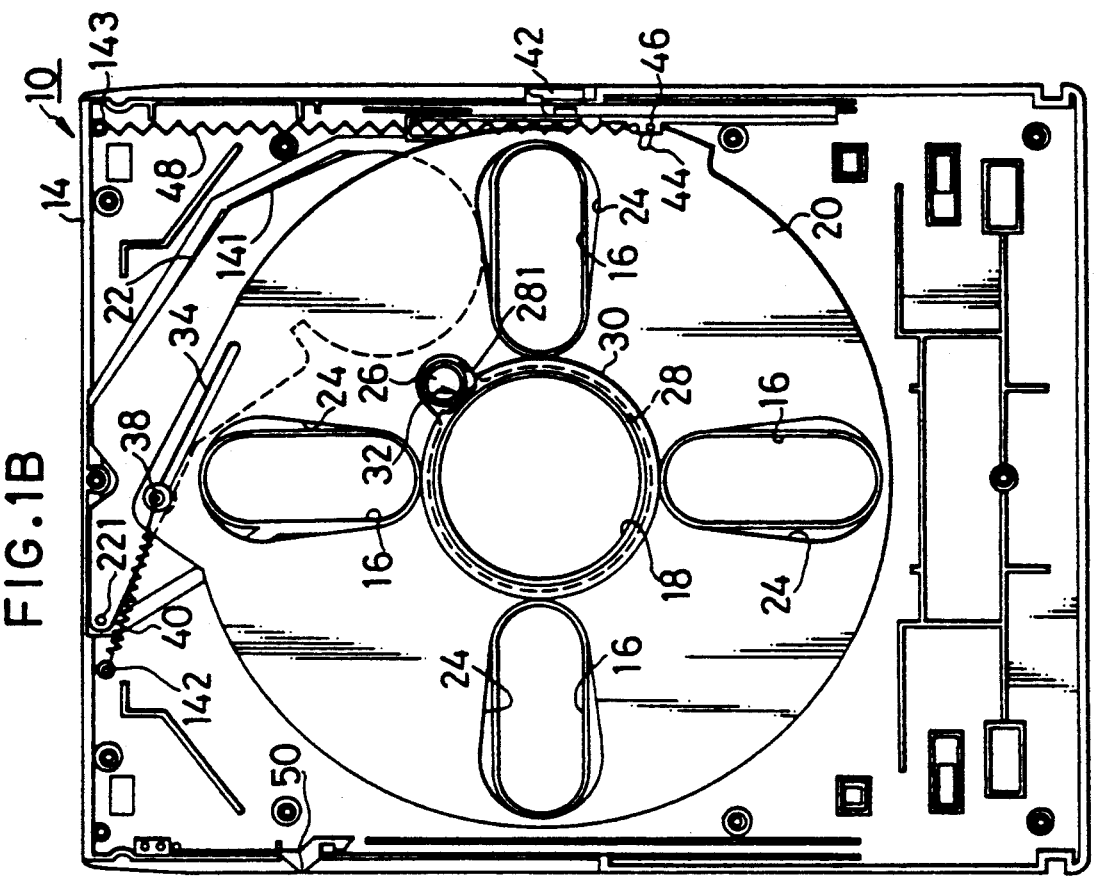
FIG. 1A is a plan view of a lower case of a disk cartridge showing an operating state of an embodiment of the disk cartridge according to the present invention in the case where shutters are closed.

Preferred embodiments of a disk cartridge of the present invention will be described with reference to FIGS. 1A to 5. A case of the disk cartridge denoted by reference numeral 10 is composed of an upper case 12 and a lower case 14, the outer perimeters of which are formed substantially in a rectangular plate shape. A disk 36 is rotatably contained in the case 10. The upper case 12 and the lower case 14 have the same shape, the same shutter opening and closing mechanism and the same component members therein. Therefore, just the lower case and the component members of the lower case 14 will be described below so as to avoid a duplication of the description.

A circular driving shaft insertion hole 18 is formed at the central portion of the lower case 14, and a plurality of long pickup insertion holes 16 having a semicircular shape at both ends thereof are formed radially in the lower case 14 at intervals around the circumference of the radially outward and driving shaft insertion hole 18. An indexing detection hole 26 is formed in the lower case 14 between and equidistant from two adjacent pickup insertion holes 16 near the driving shaft insertion hole 18. A recess 141 is formed inside the lower case 14 to correspond to the moving range of a turning shutter 22, and the turning shutter 22 is disposed in the recess 141. A rotary shutter 20 is superposed above the turning shutter 22. The rotary shutter 20 is formed substantially as a disk-shaped flat plate, a plurality of window holes 24 being formed therein at intervals corresponding to the pickup insertion holes 16 of the lower case 14 and a central hole 28 being at the center thereof. The rotary shutter 20 is rotatably supported by a disk holder 30 provided at the periphery of the driving shaft insertion hole 18 of the case 14. Each of the window holes 24 formed at the periphery of the driving shaft insertion hole 18 of the lower case 14 has an elliptical shape in which the opening width of the window hole gradually increases from the inner peripheral side toward the outer peripheral side. The central hole 28 of the rotary shutter 20 is partly formed with a cutout 281 corresponding to the indexing detection hole 26 of the lower case 14. The rotary shutter 20 is formed substantially in the same shape as the disk 36. Since static electricity is hardly generated when the surface of the rotary shutter 20 opposed to the disk 36 is formed of metal, it is preferable to form the entire surface thereof of a metal material such as stainless steel or aluminum alloy. A synthetic resin plate having its surface finished with a metal-plated layer such as a chromium-plated layer may be employed as the rotary shutter.

The shape of the window holes 24 formed in the rotary shutter 20 will now be described in more detail. Since the distance the outer side of the rotary shutter 20 has to move with respect to a predetermined rotating angle is longer than the distance the inner peripheral side thereof has to move, when the window holes 24 formed in the shutter have the same shape as the pickup insertion holes 16 formed in the case, there is a tendency for the window holes to be incompletely opened at the outer peripheral side even when just a small deviation of the rotating angle occurs. Therefore, even if a small deviation of the rotating angle occurs, the window holes 24 formed in the rotary shutter 20 can be accurately and completely opened by forming the window holes 24 in such a manner that the opening width thereof gradually increases from the inner peripheral side toward the outer peripheral side, as is the case in this embodiment.

The turning shutter 22 is pivotally supported by a pivotal connector 221 having a center at a position separate from the center of the rotary shutter 20, and is disposed rotatably in the recess 141 of the lower case 14 so as to open or close the driving shaft insertion hole 18, the indexing detection hole 26 and the cutout 281 of the rotary shutter 20. The shape of the turning shutter 22 is such that the driving shaft insertion hole 18, the pickup insertion holes 16 and the indexing detection hole 26 formed in the lower case 14 are not closed when they are opened as the turning shutter 22 and the rotary shutter 20 are moved to the opening positions and the driving shaft insertion hole 18, the indexing detection hole 26 and the cutout 32 of the disk holder 30 are closed when they are closed. The rotary shutter 20 and the turning shutter 22 are so provided as to be interlockable with each other by engaging a cam mechanism such as a cam groove 34 with an engaging shaft 38. In this embodiment, a cam groove 34 is so formed as to be extended substantially tangentially to the outer periphery of the rotary shutter 20. The engaging shaft 38 to be engaged with the cam groove 34 is provided near the pivotal connector 221 at the intermediate portion of the turning shutter 22 which serves as the turning center of the turning shutter 22. A spring 40 for holding both the shutter 20 and 22 in the closing position and in the opening position is extended between the engaging shaft 38 of the cam mechanism and an inner wall portion 142 of the case near the pivotal connector 221 of the rotary shutter 22. The inner wall portion 142 of the case to which one end of the spring 40 is fixed is provided at a position substantially equidistant from both the positions of engaging shaft 38 when the turning shutter 22 is disposed at the opening and closing positions. It is preferable to extend the spring 40 so that the longitudinal direction of the cam groove 34 formed on the rotary shutter 20 becomes substantially the same as the biasing direction of the spring 40 When the rotary shutter 20 and the turning shutter 22 are opened.

A slider 42 connected to the rotary shutter 20 is slidably provided along the outer end of the lower case 14 so as to open or close the rotary shutter 20 and the turning shutter 22 when the disk cartridge is charged in or removed from a recorder/reproducer. In this embodiment, the rotary shutter 20 is coupled to the slider 42 by a radial cutout 44 formed on the outer periphery of the rotary shutter 20 and an engaging pin 46 fixed to the slider 42 to be engaged with the cutout 44. A spring 48 for biasing the rotary shutter 20 and the turning shutter 22 in a closing direction is extended between the slider 42 and a corner 143 of the lower case 14.

The disk holder 30 is a ring mounted around the driving shaft insertion hole 18 of the lower case 14 so as to serve as a bearing for supporting the rotary shutter 20, to position the disk 36 so that the disk 36 may not come in contact with the rotary shutter 20 and to arrange the rotary shutter 20 and the turning shutter 22 in a direction of the rotating axis of the disk 36 respectively. The disk holder 30 is an annular ring which has a cylindrical wall 301 and a flange 302 extending radially outward from an upper end thereof. The cylindrical wall 301 is fitted into the hole 28 of the rotary shutter 20 to serve as a bearing portion. An upper end surface 303 of the flange 302 supports the disk 36 and the bottom end surface 304 is opposite to the upper surface of the rotary shutter 20. The cutout 32 partly formed on the upper end surface of the flange 302 is located at an angular portion where the indexing detection hole formed on the lower case 14 is disposed. The cylindrical wall is cut away along a circumference to the semicircle on the lower side thereof so that the turning shutter 22 may come into a position to close the driving shaft insertion hole A bottom end surface 306 of the cutout portion 305 of the cylindrical wall guides the turning shutter 22 which is moving and positions the turning shutter 22 in a vertical direction. An arcuate rib 307 formed to extend downward from the bottom of the cylindrical wall 301 is fitted into a groove 144 and adhesively fixed thereto. The groove 144 is formed inside the case 14 by a rim of the driving shaft insertion hole 18 and an arcuate rib 146. Small cutouts 307a, 307b, 307c, provided at the arcuate rib 307, each receive a small radial rib formed in the case 14. The cylindrical wall 301 is provided with a plurality of projections 308, 308 each protruding radially outward along the bottom end surface 306 of the cutout portion 305 thereof at a predetermined distance from each other in a circular direction. These projections 308, 308 each have a respective upper surface 308a which engages with the bottom surface of the rotary shutter 20 to position the rotary shutter 20 vertically.

The rotary shutter 20 is rotatably supported on the outer surface of the cylindrical wall 301 and held between the bottom surface 304 of the flange 302 and upper surfaces of the projections 308, 308 and the arcuate rib 146 so as to position the rotary shutter 20 vertically, or in a direction of the rotation axis of the disk. The turning shutter 22 is positioned vertically by the bottom end surface 306 and the upper surface of the rim 145 of the driving shaft insertion hole 18 when the circular portion of the turning shutter 22 is located near or at the driving shaft insertion hole 18 to close it.

A stopper 50 is provided along the side of the lower case 14 opposite to the side provided with the slider 42, and is formed at one end with a hook to be engaged with an end of the slider 42 of the upper case 12 when the rotary shutter 20 and the turning shutter 22 provided on the upper case 12 are closed.

The lower case 14 of the case 10 is constructed as described above, and the upper case 12 has the same shape and construction as that of the lower case 14. The lower and upper cases 14, 12, or a pair of case halves, each having assembled its components therein, are adhesively joined together at their inner sides so as to contain the disk 36 and a spacer 52 therein to complete a disk cartridge.

Figure 1B:
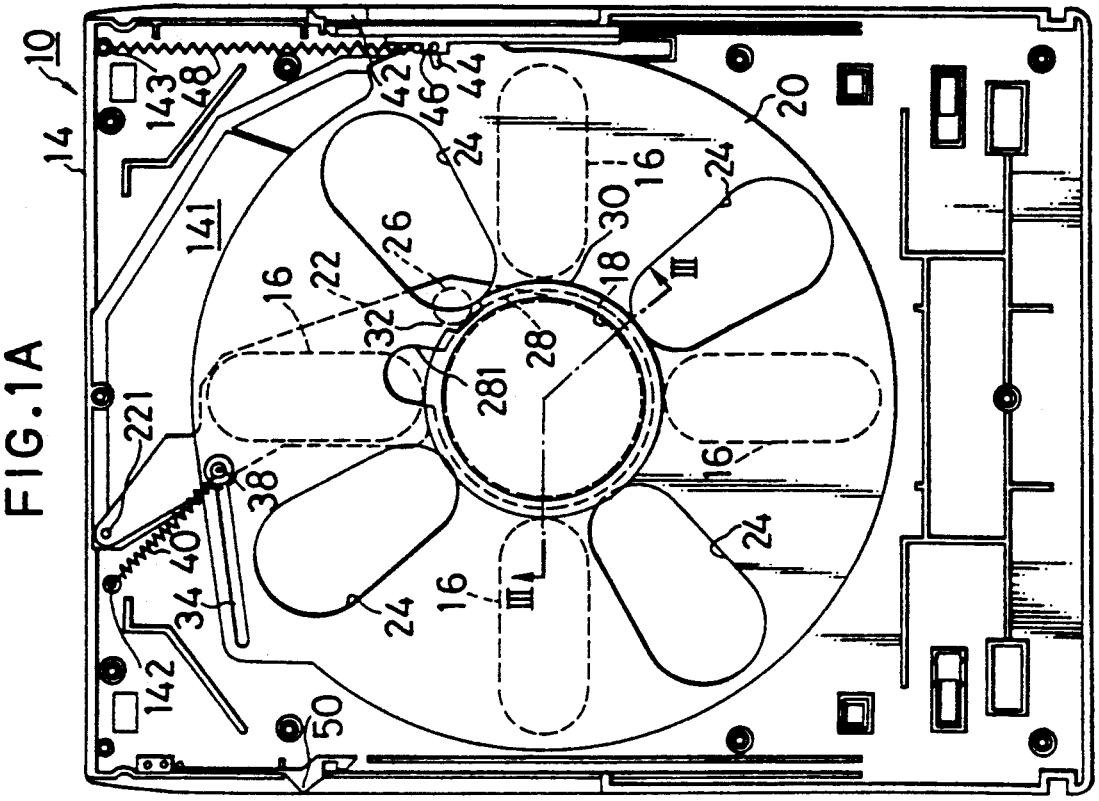
FIG. 1B is a plan view of the lower case showing another operating state of the same disk cartridge in the case where the shutters are opened.
Figure 3:
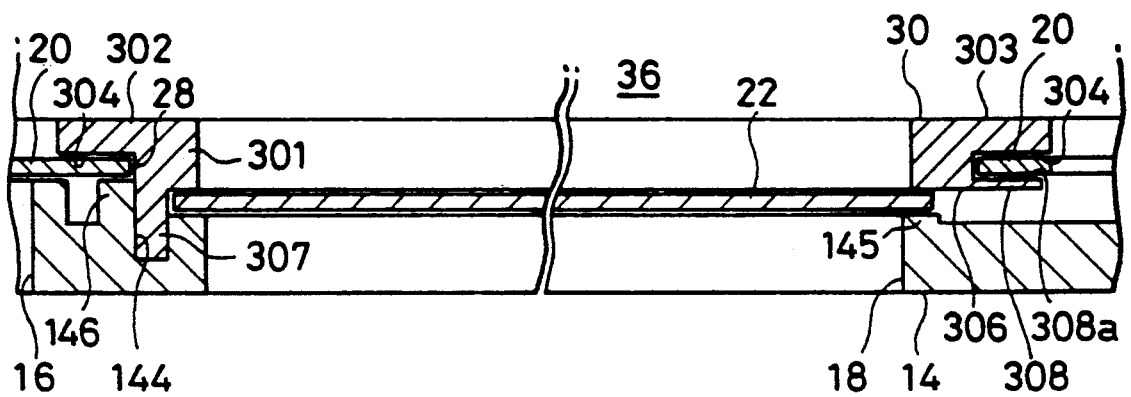
FIG. 3 is an enlarged partial sectional view taken along the line III—III in FIG. 1A.
Figure 4:
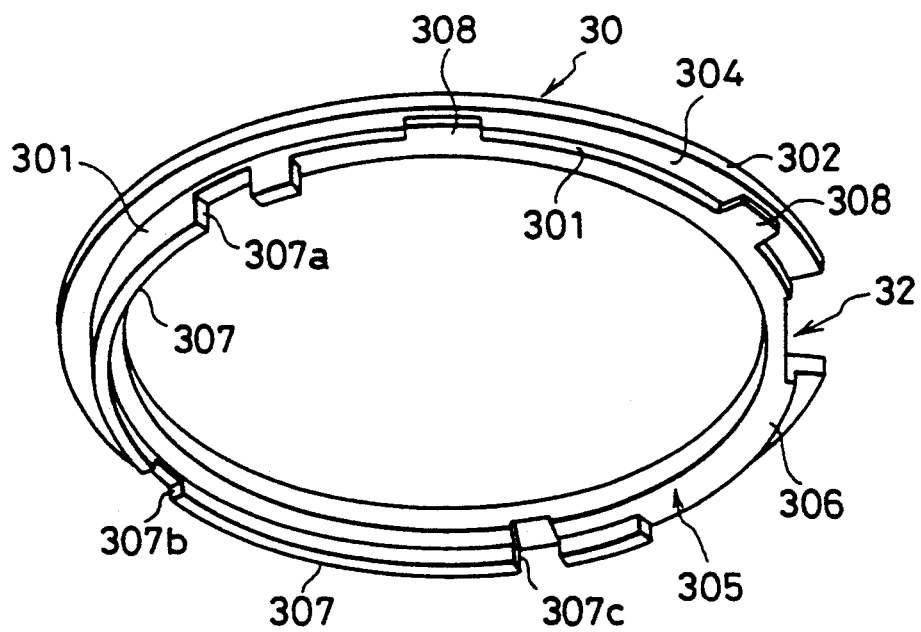
FIG. 4 is a perspective view, from below, of a disk holder.
Figure 5:
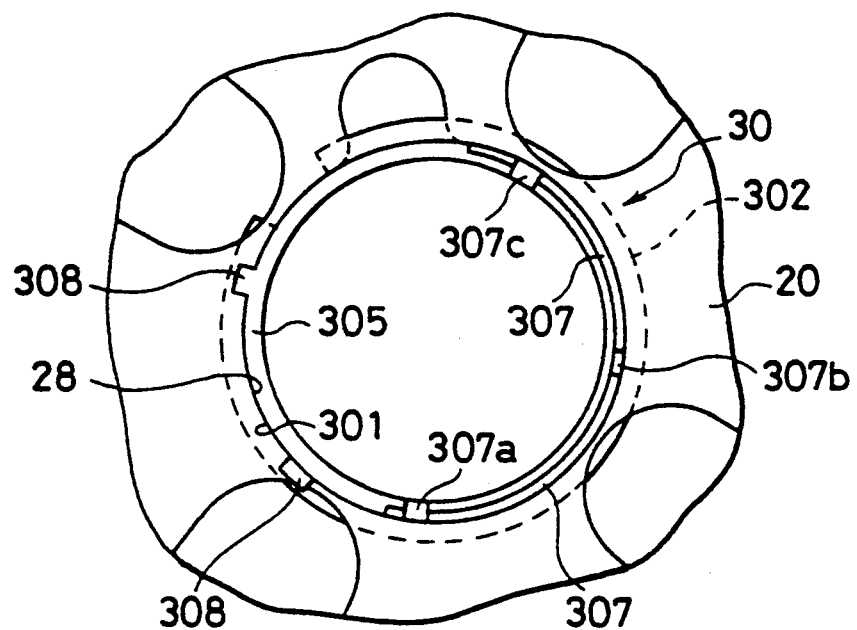
FIG. 5 is a bottom view showing part of the disk holder with the lower case.

When the disk cartridge of the embodiment constructed as described above is inserted and set in a recorder/reproducer, the end of the slider 42 is disengaged from the hook of the stopper 50, the slider 42 is moved against the spring, the rotary shutter 20 is rotated around the disk holder 30 provided around the driving shaft insertion hole 18 via the engaging pin 46 and the engaging cutout 44 in cooperation with the slider 42, and the pickup insertion holes 16 formed in the case and the window holes 24 of the rotary shutter 20 are aligned with each other so as to be opened. Since the turning shutter 22 is turned around the pivotal connector 221 by the cam groove 34 and the engaging shaft 38 upon rotation of the rotary shutter 20, the driving shaft insertion hole 18 and the indexing detection hole 26 are opened. The rotary shutter 20 and the turning shutter 22, by which the driving shaft insertion hole 18, the pickup insertion holes 16 and the indexing detection hole 26 are opened, are held in an open state by the slider 42 and the spring 40, as shown in FIG. 1B.

On the other hand, when the disk cartridge is removed from the recorder/reproducer, the slider 42 is slid by the contraction force of the spring 48, the rotary shutter 20 is rotatably moved by the engaging pin 46 and the engaging cutout 44, the turning shutter 22 is turned in cooperation with the rotary shutter 20 to close the driving shaft insertion hole 18, the pickup insertion holes 16 and the indexing detection hole 26, and both of the shutters 20 and 22 are held in a closed state, as shown in FIG. IA. The end of the slider 42 is engaged with the hook of the stopper 50.

During the opening and closing operations, the rotary shutter 20 moves in a state where the rotary shutter 20 is held between the bottom end surface 304 of the flange 302 and the upper surfaces of the projections 308, 308 and the arcuate rib 146 of the case 14 so as to be positioned vertically or in the direction of the axis of roation of the disk. When the circular portion travels in the vicinity of the driving shaft insertion hole 18, the turning shutter 22 moves in a state where the turning shutter 22 is vertically positioned by the bottom end surface 306 of the disk holder 30 and the upper surface of the rim 145 of the driving shaft insertion hole 18. Each of the shutters is neither skewed with respect to the axis of rotation nor distorted. Consequently, the rotary shutter 20 and the turning shutter 22 can move smoothly and interlockably without rubbing against each other or with another member, such as the disk.

Figure 6:
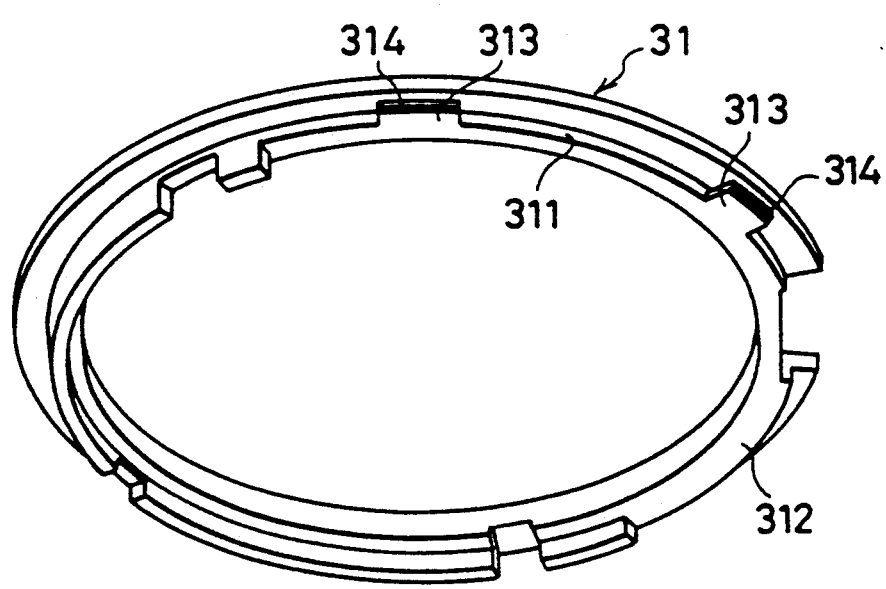
FIG. 6 is a perspective view similar to FIG. 4 but showing a modified disk holder.

FIG. 6 illustrates a modified disk holder. A disk holder 31 is provided with a plurality of projections 313, 313 formed along the bottom end surface 312 defined by the cutout portion thereof. Each of the projections 313, 313 is chamfered to be formed with a slope 314 on an outer edge thereof. In such a manner, the turning shutter 22 can be guided smoothly without any catching when the turning shutter 22 slides in between the case wall and the projections 313, 313. It is sufficient if one of the projections which the turning shutter 22 comes across first is provided with a slope. Additionally, as not shown in the drawings, it is effective that a portion of the disk holder 31 on which the turning shutter 22 begins to slide is chamfered, such as an outer edge of the bottom surface 312 of the cutout portion of the cylindrical wall 311, if required.

Another embodiment of the disk cartridge of the present invention will be described with reference to FIGS. 7A to 9. A disk (Not shown) is rotatably contained in a case 60 made of an upper case (not shown) and a lower case 64, and the case is provided with a plurality of pickup insertion holes 66 and a driving shaft insertion hole 68. A rotary shutter 70 formed with a plurality of window holes 74 at positions corresponding to the plurality of pickup insertion holes 66 is rotatably provided around a disk holder 80 provided around the driving shaft insertion hole 68. A turning shutter 72 for opening and closing the driving shaft insertion hole 68 is provided so as to be able to turn in the lower case 64 via a pivotal connector 721 having a center at a position separate from the center of the rotary shutter 70. The rotary shutter 70 is made interlockable with the turning shutter 72 by engaging the cam groove 84 with an engaging shaft 88. A spring 90 for biasing both the shutters 70 and 72 in a closing direction and for holding them in an open state is extended at one end thereof to the engaging shaft 88 and at the other end thereof to an inner wall portion 642 of the case near the pivotal connector of the turning shutter 72. A slider 92 for opening and closing the rotary shutter 70 and the turning shutter 72 is slidably provided along the end of the case 64 at the side opposite to the pivotal connector 721 of the turning shutter 72. The slider 92 is coupled to the rotary shutter 70 through a connecting member 102.

The disk holder 80 is an annular ring having bottom end surfaces 801 and 802 for positioning an upper surface of the rotary shutter 70 and the turning shutter 72 respectively. The disk holder 80 is formed with an annular rib 803 having a cylindrical outer surface on which the rotary shutter 70 is rotatably supported. The bottom end portion of the annular rib 803 is fixed to an arcuate rib 641 which protrudes from the case 64 and extends over almost a semicircle.

Figure 7B:
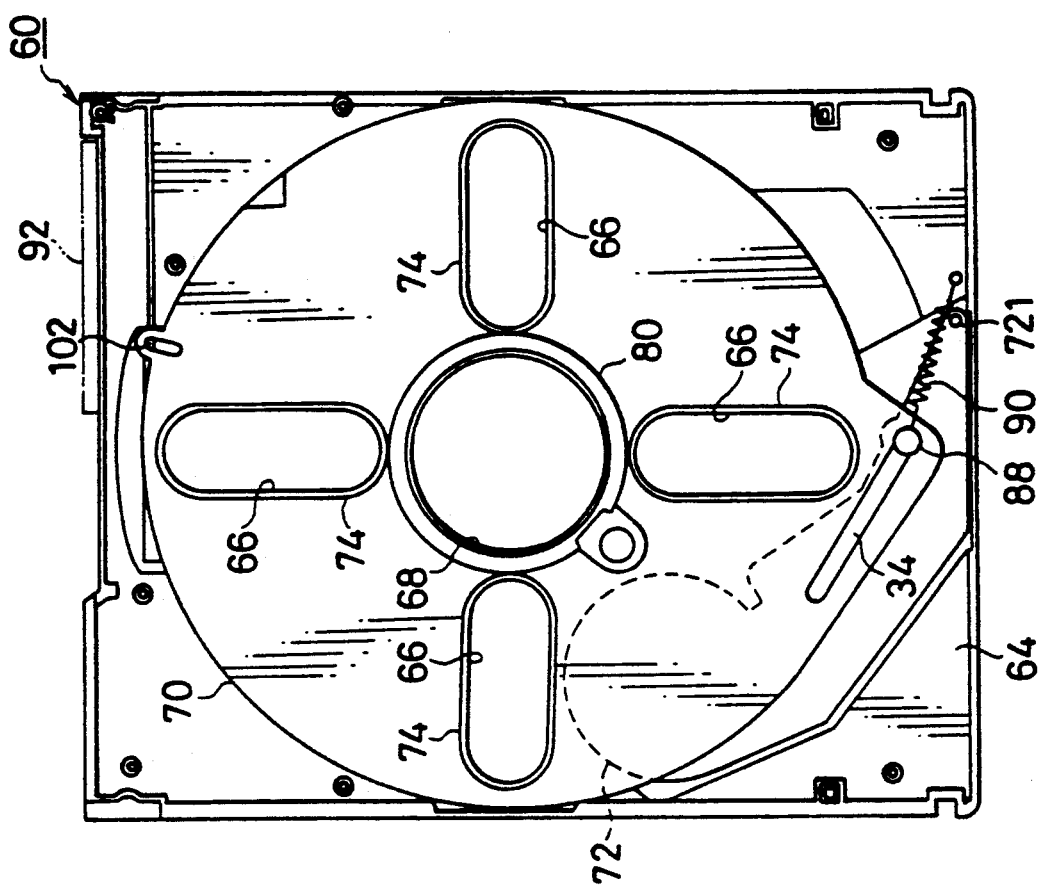
FIG. 7B is a plan view of the lower case showing another operating state of the same disk cartridge in the case where the shutters are opened.
Figure 7A:
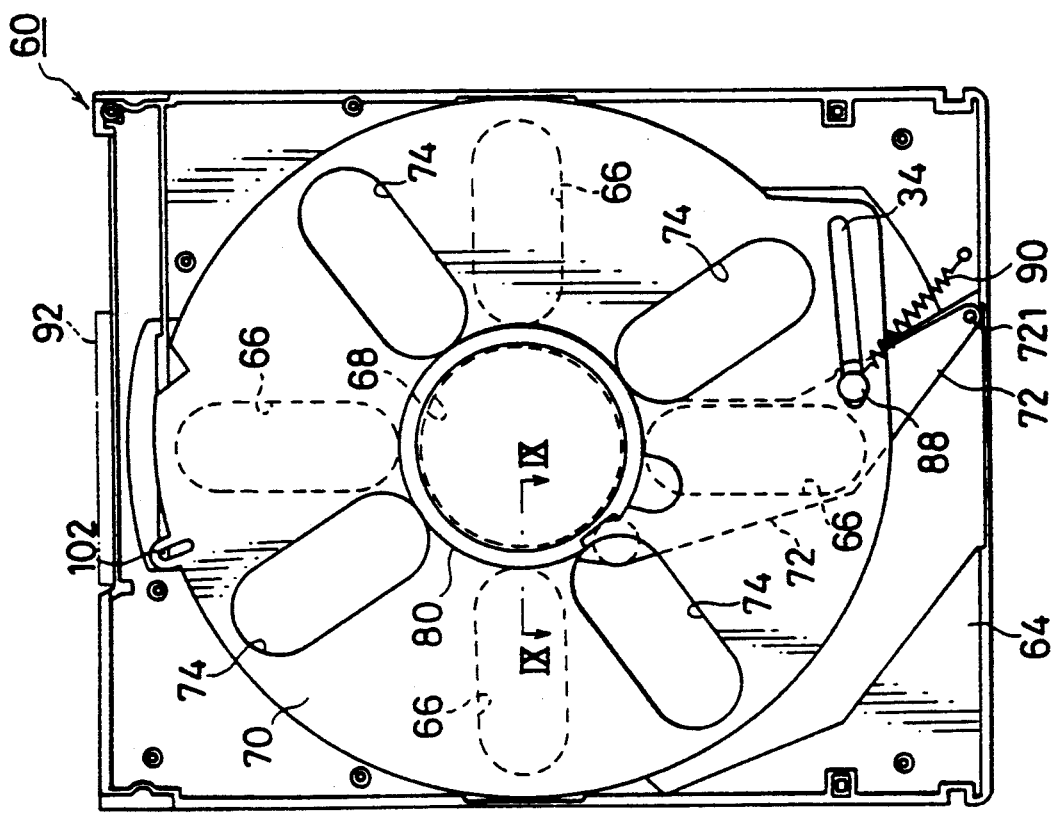
FIG. 7A is a plan view of the lower case showing an operating state of another embodiment of the disk cartridge according to the present invention in the case where the shutters are closed.
Figure 8:
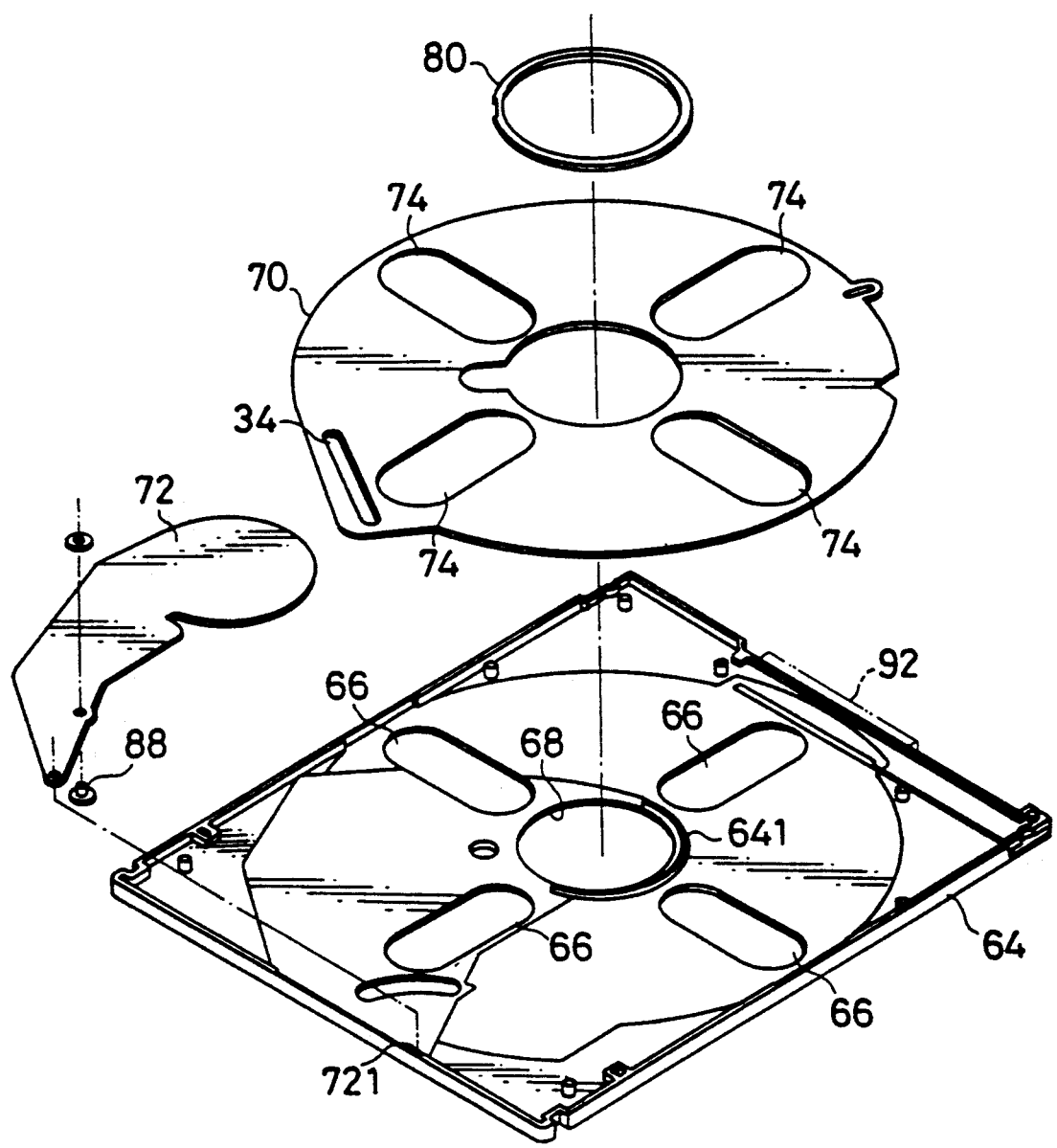
FIG. 8 is a perspective view of the lower case of the same disk cartridge in a disassembled state.
Figure 9:
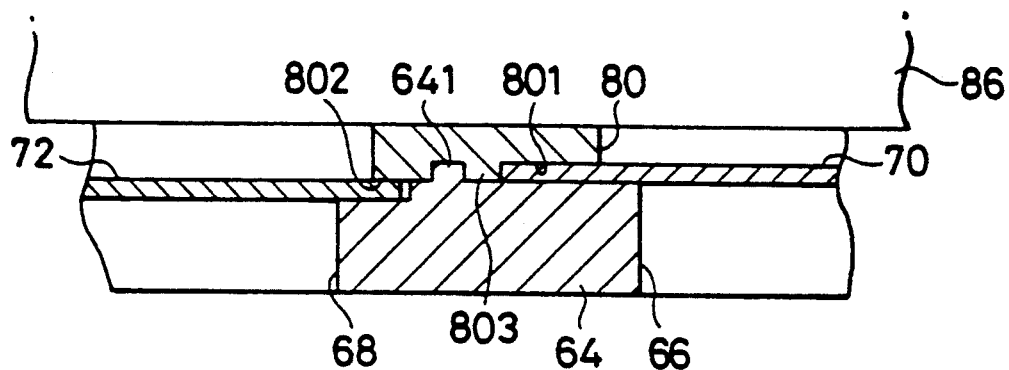
FIG. 9 is an enlarged partial sectional view taken along the line IX—IX in FIG. 7A.

When the disk cartridge of this embodiment is inserted and set in a recorder/reproducer, the slider 92 is moved together with the connecting member 102, and the rotary shutter 70 is rotated around the disk holder 80. Further, the turning shutter 72 is turned around the pivotal connector 721, and the plurality of pickup insertion holes 66 and the driving shaft insertion hole 68 formed in the case 60 are opened at the same time and held in an opening state as shown in FIG. 7B. On the other hand, when the disk cartridge is removed from the recorder/reproducer, the turning shutter 72 and the rotary shutter 70 are moved in a closing direction by the spring 90 to close the insertion holes 66 and 68, and are held in a closed state as shown in FIG. 7A.

In the disk cartridge of this embodiment, the rotary shutter 70 and the turning shutter 72 move in a state where their upper surface and bottom surface are held by the bottom end surfaces 801, 802 and the case 64 so as to position the shutters vertically or in the direction of the axis of rotation of the disk in the same manner as the embodiment previously described. Each of the shutters is neither skewed with respect to its axis of rotation nor distorted.

Figure 10:
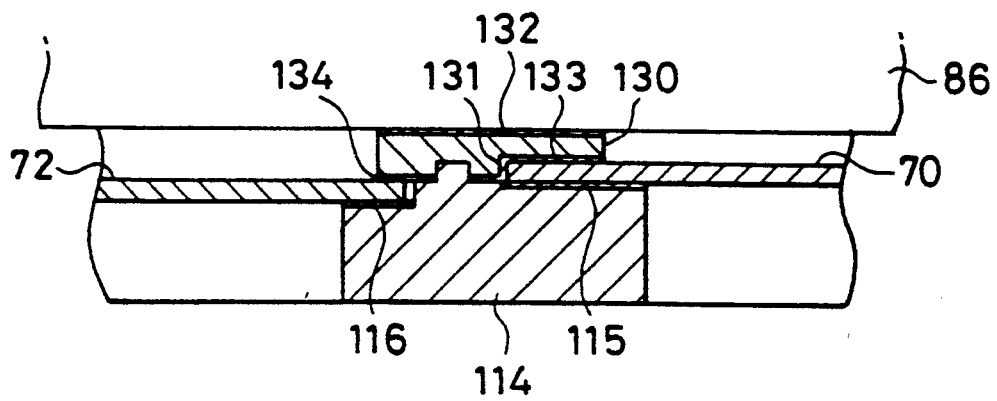
FIG. 10 is an enlarged partial sectional view similar to FIG. 9 but showing a modified disk cartridge.

If a disk holder is made of synthetic resin, supporting portions thereof are cut easily by a rotary shutter in rotation. The worn powder from these portions adheres to a disk surface so that an error in reading occurs or damage to the disk surface is done. The disk holder of synthetic resin has such a low rigidity that a heavy weight of the shutters acting upon the disk holder deforms the disk holder and a gap is produced between the case and each of the shutters to permit dust to enter into the case. In case a supporting surface opposite to the disk is made of synthetic resin, dust easily adheres to the disk surface due to static electricity and an error in reading often occurs. Therefore, in a modified arrangement as shown in FIG. 10, it is preferable that a disk holder is provided with a wear-resistance layer at a portion thereof for supporting a rotary shutter or a disk. The disk holder 130 is an annular ring made of synthetic resin which is formed with wear-resistance layers 131, 132 of chromium-plating on an outer surface for supporting a rotary shutter 70 and an upper surface for supporting a disk 86 respectively. Additionally, it is preferable that wear-resistant layers 133, 134, 115, 116 are formed on respective surfaces of the disk holder 130 or a case 114 for vertically positioning the rotary shutter 70 or the turning shutter 72. Instead of chromium-plating as a wear-resistant layer, a ring or plate of metal, such as stainless steel and aluminum alloy may be disposed fixedly. The disk holder of this embodiment is provided with wear-resistant layers so that rigidity of the disk holder as well as the wear-resistant of the sliding portion increases. Consequently, the disk holder is not distorted and a gap is not produced between the case and the shutters even if the weight of the shutters acts on the disk holder. Dust is prevented from entering in the case positively. In the embodiments described above, the cam groove formed on the rotary shutter and the engaging shaft provided at the turning shutter are employed as a cam mechanism for making the rotary shutter cooperate with the turning shutter. However, the present invention is not limited to these particular embodiments. For example, the cam groove may be provided at the turning shutter and the engaging shaft may be provided on the rotary shutter. Alternatively, a recess and a projection may be respectively formed at both the shutters or coupling members, and the projection may be engaged with the recess, or an interlocking mechanism may be constructed by another member between both of the shutters.

According to the disk cartridge of the present invention, the rotary shutter and the turning shutter for opening and closing the pickup insertion holes and the driving shaft insertion hole are provided so that they can cooperate with each other. Therefore, the window holes can be completely shielded with ease, and dust can be positively prevented from entering the disk cartridge. Also, the turning shutter and the rotary shutter can be stably opened and closed, and are not rubbed by the disk in the case, or damaged or cut when in contact with the disk. Even if a the disk cartridge having a plurality of pickup insertion holes is provided, the structure is simply and compactly formed.

This invention can be variously modified without departing from the spirit, scope and essential features thereof. Therefore, the above-described embodiments are mere illustrations, and should be interpreted in a limiting manner. The scope of the present invention is amended by the claims, but not limited by the text of the specification, and any modifications and alterations equivalent to the scope of the claims should be considered as being included within the scope of the present invention.

What is claimed is:

1. A disk cartridge comprising:
   a case formed with a driving shaft insertion hole and a plurality of pickup insertion holes,
   a disk having an axis of rotation and being rotatably contained in said case,
   a rotary shutter formed with a plurality of window holes provided at positions corresponding to said plurality of pickup insertion holes and rotatably and coaxially disposed around said driving shaft insertion hole,
   a turning shutter having a center at a position separate from a center of said rotary shutter to be rotatable with respect to the center of the turning shutter to open and close said driving shaft insertion hole, and
   a positioning means disposed on an inner side of said case at a periphery of said driving shaft insertion hole, for supporting said rotary shutter and positioning said rotary shutter and said turning shutter in a direction of said axis of rotation.

2. A disk cartridge according to claim 1, wherein said positioning means comprises an annular ring which is arranged coaxially around said driving shaft insertion hole and which includes end surfaces for positioning a surface of said rotary shutter and a surface of said turning shutter respectively.

3. A disk cartridge according to claim 2, wherein said ring includes a cylindrical wall rotatably supporting said rotary shutter and a flange extending radially outward, said cylindrical wall being formed with a cutout to be slid therein by said turning shutter and a holder to hold said rotary shutter.

4. A disk cartridge according to claim 3, wherein said holder comprises a plurality of projections formed on an outer surface of said cylindrical wall adjacent to said cutout with predetermined intervals therebetween.

5. A disk cartridge according to claim 4, wherein at least one of said projections is chamfered to be formed with a slope on an edge thereof.

6. A disk cartridge according to claim 1, wherein said positioning means is provided with a wear-resistant layer at a portion thereof supporting said rotary shutter.

7. A disk cartridge according to claim 1, wherein said positioning means further includes a support surface opposite to said disk, said support surface being provided with a wear-resistant layer.

8. A disk cartridge according to claim 6, wherein said wear-resistant layer is formed by chromium-plating.

9. A disk cartridge according to claim 6, wherein said wear-resistant layer is formed of a stainless steel ring provided at said portion of the positioning means supporting said rotary shutter.

10. A disk cartridge according to claim 7, wherein said wear-resistant layer is formed by chromium-plating.

11. A disk cartridge according to claim 7, wherein said wear-resistance layer is formed of a stainless steel ring provided on said support surface.

12. A disk cartridge comprising:
    a pair of case halves each formed with a driving shaft insertion hole and a plurality of pickup insertion holes,
    an annular disk holder mounted on an inner wall of each of said case halves at a periphery of said driving shaft insertion hole, said disk holder including a cylindrical wall and a flange extending radially from one end of the cylindrical wall, and said cylindrical wall being provided with a cutout formed at the other end thereof and a projection protruding radially outward adjacent to the cutout,
    a rotary shutter formed with a plurality of window holes provided at positions corresponding to said plurality of pickup insertion holes and rotatably supported by said cylindrical wall,
    a turning shutter rotatably supported by a pivotal shaft provided in each of the case halves at a position separate from a center of said rotary shutter to open and close said driving shaft insertion hole, said turning shutter being coupled with said rotary shutter interlockably,
    a slider which slides along an outer peripheral end portion of each of the case halves and is coupled to said rotary shutter, and
    a disk rotatably contained within said pair of case halves being joined together at their inner sides.

13. A disk cartridge according to claim 12, wherein said flange includes a first surface opposite to and supporting said disk and a second surface opposite to said turning shutter so as to hold said turning shutter in cooperation with the inner wall of each of the case halves therebetween.

14. A disk cartridge according to claim 12, wherein said cylindrical wall is provided with an end surface defined by said cutout so that said turning shutter slides into between said end surface and a rim of said driving shaft insertion hole.

15. A disk cartridge according to claim 14, wherein said projection is chamfered to be formed with a slope on an outer edge thereof.

16. A disk cartridge according to claim 12, wherein said cylindrical wall is formed with an arcuate rib at an end portion, and said inner wall of each of the case halves is formed with a groove in which said rib is fixed thereto.

* * * * *